United States Patent [19]
Murray

[11] Patent Number: 5,206,839
[45] Date of Patent: Apr. 27, 1993

[54] UNDERWATER SOUND SOURCE

[75] Inventor: Bruce S. Murray, Winchester, Mass.

[73] Assignee: Bolt Beranek and Newman Inc., Cambridge, Mass.

[21] Appl. No.: 796,075

[22] Filed: Nov. 20, 1991

Related U.S. Application Data

[63] Continuation-in-part of Ser. No. 575,326, Aug. 30, 1990.

[51] Int. Cl.⁵ .......................................... H04R 15/00
[52] U.S. Cl. ..................................... 367/175; 367/171
[58] Field of Search ............... 367/142, 156, 168, 174, 367/175; 181/121; 310/26, 29, 34–36; 318/119, 124, 556, 114

[56] References Cited

U.S. PATENT DOCUMENTS

| | | | |
|---|---|---|---|
| 2,419,196 | 4/1947 | Benioff | 367/174 |
| 3,018,467 | 1/1962 | Harris | 367/153 |
| 3,205,476 | 9/1965 | Massa | 367/141 |
| 3,219,969 | 11/1965 | Snavely | 367/141 |
| 3,225,326 | 12/1965 | Massa | 367/141 |
| 3,308,423 | 3/1967 | Massa, Jr. | 367/141 |
| 3,327,285 | 6/1967 | O'Connor et al. | 367/174 |
| 3,363,227 | 1/1968 | Massa, Jr. | 367/141 |
| 3,441,903 | 4/1969 | Massa, Jr. | 367/141 |
| 3,464,057 | 8/1969 | Hayner et al. | 367/141 |
| 3,691,515 | 9/1972 | Pida | 367/141 |
| 3,725,856 | 4/1973 | Chervenak | 367/141 |
| 4,361,879 | 11/1982 | Dubbelday et al. | 367/141 |
| 4,660,186 | 4/1987 | Massa | 367/142 |
| 4,745,586 | 5/1988 | Massa | 367/175 |

Primary Examiner—Brian S. Steinberger
Attorney, Agent, or Firm—Henry D. Pahl, Jr.

[57] ABSTRACT

In the underwater sound source disclosed herein, rigid diaphragms are provided at opposed ends of a hollow shell, the periphery of each of the diaphragms being sealed to the shell. Respective spring means operating between the shell and each of the diaphragms allows axial displacement of the diaphragm in response to external pressure. A lightweight magnetic armature structure is connected to each of the diaphragms and opposed electromagnetic core structures provide magnetic circuits which link each of the armature structures across respective gaps. Further spring means are provided for centering each of the armature structures between the respective magnetic core structures. By appropriately energizing windings on the magnetic core structures, the armatures together with their respective diaphragms are caused to oscillate.

7 Claims, 4 Drawing Sheets

UNDERWATER SOUND SOURCE

CROSS-REFERENCE TO RELATED APPLICATIONS

This application is a continuation-in-part of application Ser. No. 07/575,326 filed on Aug. 30, 1990.

BACKGROUND OF THE INVENTION

The present invention relates to underwater sound sources and more particularly to such a sound source utilizing balanced magnetic motors driving opposed diaphragms to obtain a linear and wide range response.

For various sonar applications, it is desirable to generate high power, relatively low frequency acoustic waves, e.g., in the range of 80–300 Hz. Further, it is often desired to generate these waves from locations at considerable depths, e.g., down to 1200 feet under water and to provide waves which are of relatively fewer spectral content. Since the energizing signals must typically be generated electronically, efficiency of transduction is of concern.

Among the several objects of the present invention may be noted the provision of a novel underwater sound source; the provision of such a sound source which is operable at relatively low sonar frequencies; the provision of such a sound source which can be operated over a relatively wide range of frequencies; the provision of such a sound source which is highly linear in response; the provision of such a sound source which is relatively efficient; the provision of such a sound source which may be operated at substantial depths; the provision of such a sound source which is highly reliable and which is of relatively simple and inexpensive construction. Other objects and features will be in part apparent and in part pointed out hereinafter.

SUMMARY OF THE INVENTION

In an underwater sound source according to the present invention, diaphragms are mounted for opposed axial movement at each end of a hollow shell, the periphery of each diaphragm being sealed to the shell. A respective spring means operating between the shell in each of the diaphragms allows axial movement of the diaphragms in response to external pressure. A magnetic armature structure is connected to each of the diaphragms and, associated with each armature, is a relatively more massive magnetic core structure. A respective second spring means operates between each of the magnetic core structures and the respective armature structures for resiliently maintaining a nominal gap. Windings on each of the magnetic core structures are connected to a supply of alternating current. Preferably, windings on the core structures are also connected to a supply of direct current and the various windings are phased such that the two armatures oscillate in opposition.

BRIEF DESCRIPTION OF THE DRAWINGS

Corresponding reference characters indicate corresponding parts throughout the several views of the drawings.

DESCRIPTION OF THE PREFERRED EMBODIMENT

The underwater sound source described herein by way of illustration employs electromagnetic transducers and more particularly electromagnetic transducers of the so called moving iron or variable reluctance type. In general, variable reluctance magnetic motors are capable of producing higher forces in a compact volume and at higher efficiency than a moving coil transducers but have typically not been used when high linearity is desired since the basic relationship between the excitation current and resulting force is in accordance with a square law and thus non-linear. The novel underwater sound source described herein obtains muchly improved linearity by utilizing a novel balanced form of magnetic motor which is the subject of my co-pending and co-assigned application Ser. No. 07/575,326, filed Aug. 30, 1990 and entitled "Electromagnetic Transducer". The disclosure of said application is incorporated herein by reference.

Figure 1:
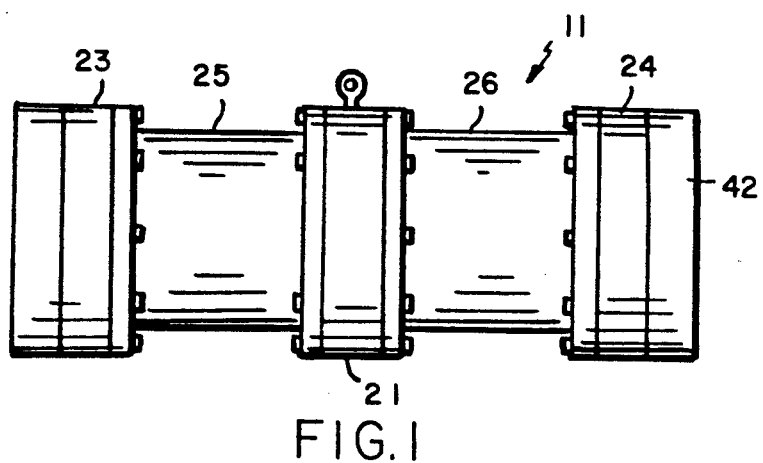
FIG. 1 is a side view of an underwater sound source constructed in accordance with the present invention.
Figure 2:
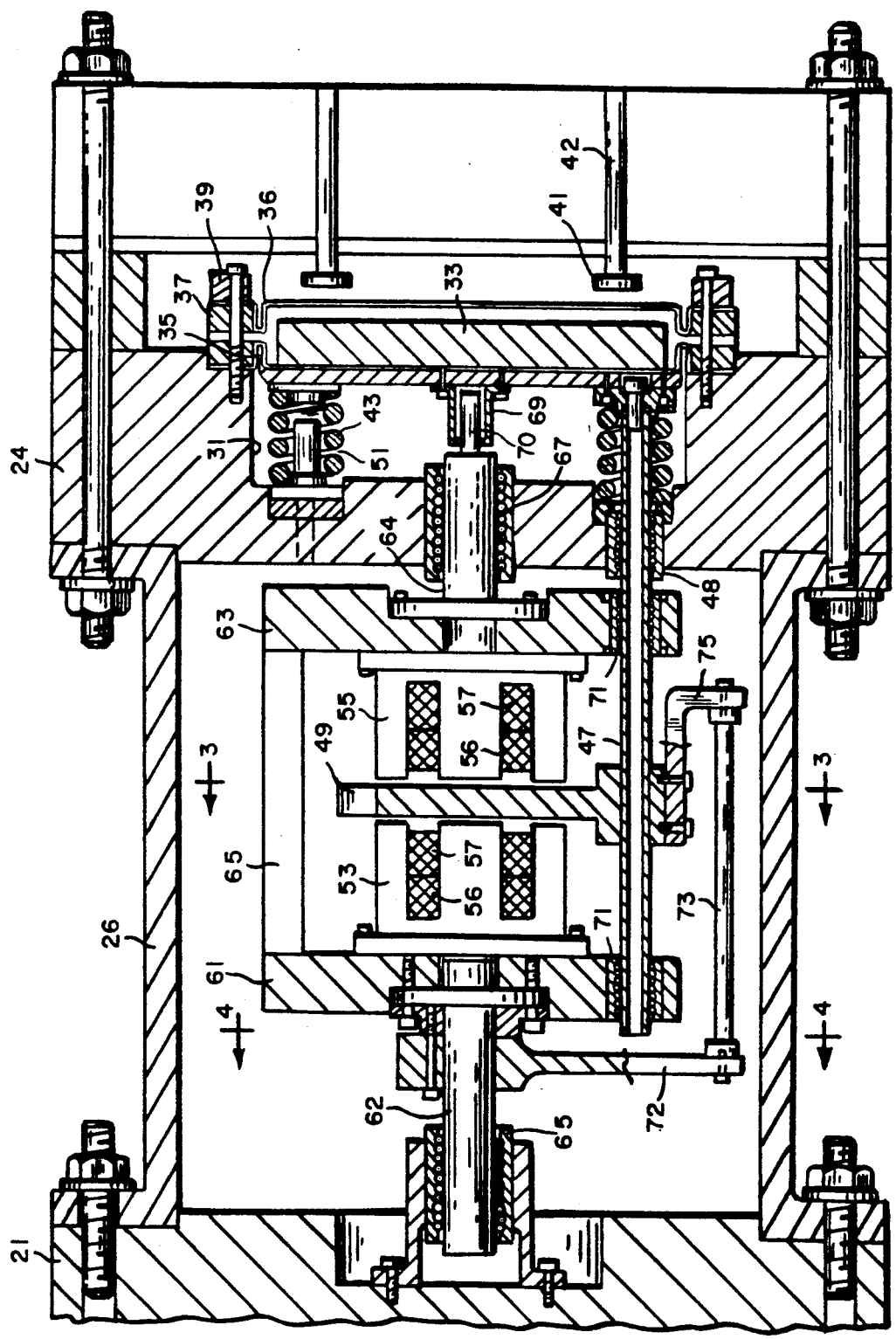
FIG. 2 is a side view, in section and to a larger scale, showing the internal section of one side of the sound source of FIG. 1.

Referring now to FIGS. 1 and 2, the underwater sound source illustrated there is roughly in the form of an elongate cylindrical shell or casing 11 and is essentially symmetric around a central plane transversed to the longitudinal axis of the cylinder. The casing or shell 11 includes a central bulkhead 21 with end bulkheads 23 and 24 which are spaced from the center bulkhead by respective flanged tubes 25 and 26, the entire assembly being held together by bolts as illustrated. The sound source includes, at each end of the cylinder, a rigid diaphragm or piston mounted for axially movement with respect to the shell. As is described in greater detail hereinafter, the diaphragms are preferably oscillated in opposition so that the sound source as a whole radiates as a monopole.

FIG. 2 illustrates the right half of the sound source in greater detail, the left half being essentially identical in mirror image. As illustrated, a recess 31 is formed in each of the end bulkheads 23 and 24. A rigid piston is provided in alignment with the recess 31, as indicated by reference character 33. Sealing is provided between the piston 33 and the casing or shell by means of a pair of rolling diaphragm seals 35 and 36, the rolling portion of each seal being located between the periphery of the piston 33 and an annular ring 37. The seals and the annular ring 37 are clamped together by a clamp ring 39 held by bolts 40. The space between the two rolling seals 35 and 36 is filled with an incompressible liquid, all gas having been purged. A preferred form of liquid for this purpose is vacuum pump oil since it is characterized by very low dissolved gases.

By arranging back to back rolling diaphragm seals in the manner illustrated, the casing may be pressurized without reverse biasing either one of the seals. As is understood by those skilled in the art, it is the nature of such seals that they do not function well if backward biased. To limit outward movement of the piston or diaphragm 33 when the housing is pressurized, a stop ring 41 is supported over the diaphragm by an acoustically transparent, axially stiff spider structure designated generally by reference character 42.

A series of coil springs 43 are provided around the periphery of the cavity 31 between the end plate 26 and the piston 33. These springs allow the piston 33 to be deflected inwardly in response to external hydrostatic pressure as the sound source is submerged. In the particular embodiment illustrated, eighteen such springs are provided.

Figure 3:
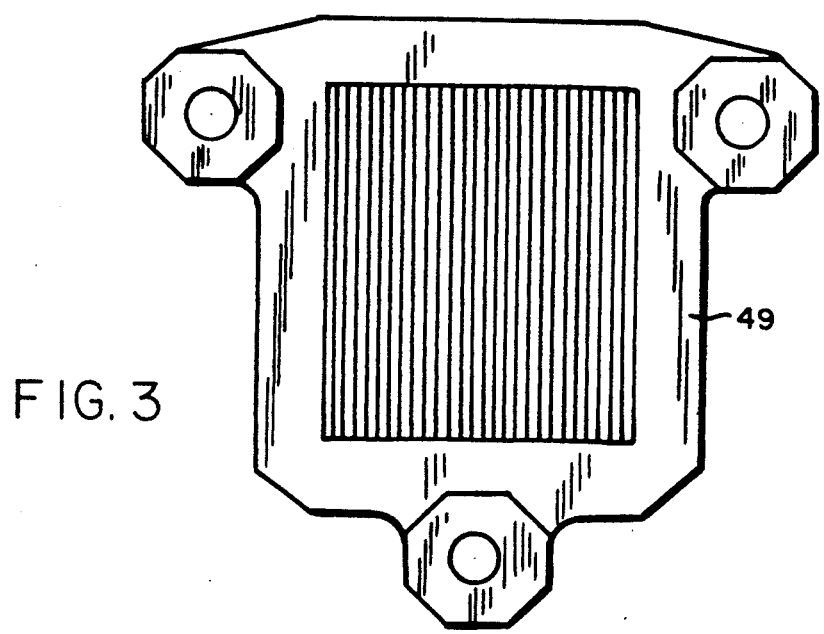
FIG. 3 is a face view of an armature structure employed in the sound source of FIGS. 1 and 2, taken substantially on the line 3—3 of FIG. 2.

Passing through three, equally spaced ones of the springs 43 are hollow rods 47 which connect the piston 33 with an armature structure 49. The outline of the armature structure is illustrated in FIG. 3. One of the three rods 47 passes through a bearing 48 in the end plate 26 so that rotation of the various axially moveable assemblies around the central axis is prevented. The other two rods 47 pass through apertures in the bulkhead 26 with clearance. Within other of the springs 43 are positioned pin-like stops 51 for limiting the inward movement of the piston 33.

Magnetic core structures 53 and 55 are provided on either side of the armature structure 49. In the embodiment illustrated the core structures 53 and 55 are made up of stacks of E-shaped laminations which provide magnetic circuits which are essentially completed by the armature structure 49. At least the central rectangular portion of the armature structure is constructed of permeable material, e.g. magnetic laminations. First and second electric coils or windings, designated by reference characters 56 and 57 respectively, are provided around the central leg of each of the E-shaped core structures 52 and 55.

The magnetic core structures 53 and 55 are mounted on a frame which comprises a pair of end plates 61 and 63 which are held in spaced relationship by spacers 65. As is explained in greater detail hereinafter, the magnetic core members 53 and 55 together with their supporting frame constitute an inertial mass against which the magnetic motor operates in driving the diaphragm 33. The mass of this inertial structure is preferably much greater than that of the diaphragm/armature structure together with the appropriate water load. Stems 62 and 64 extending axially from the respective end plates 61 and 63 pass through respective axial bearings 65 and 67, mounted on the center bulkhead 21 and the end bulkhead 24 respectively, so that the entire inertial mass can move axially with respect to the casing. Centering of the piston 33 is controlled by a similar axial bearing 69 which fits around an extension 70 on stem 64. The rods 47, which connect the armature structure 49 to the piston or diaphragm 33 also pass through axial bearings 71 in the end plates 61 and 63.

Figure 4:
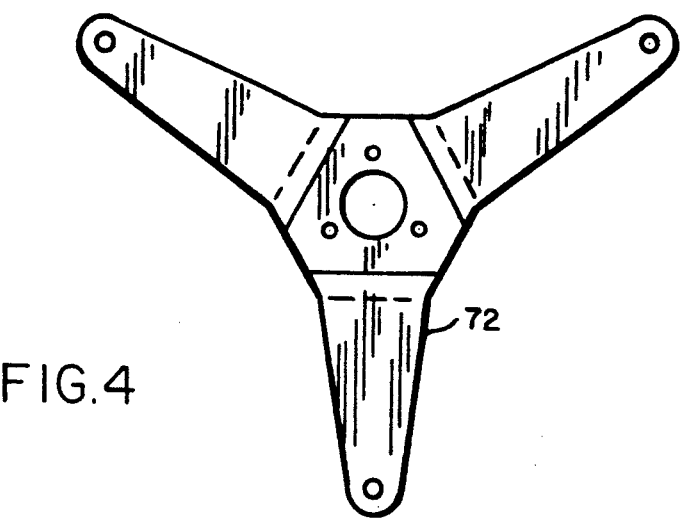
FIG. 4 is a face view of a radial spring employed in the sound source, taken substantially on the line 4—4 of FIG. 2.

A three-tined radial spring 72 operates between the core supporting frame and the armature structure so as to resiliently maintain their relative nominal positioning, i.e. with the armature centered in the gap between the two E-shaped magnetic cores. The peripheral shape of the spring 72 is illustrated in greater detail in FIG. 4.

The end of each of the three tines is connected to the armature structure by means of a tie rod 73 and a bracket 75. The rest position is adjusted, e.g., by shimming, so that the armature is centered between the two cores with the gaps between each core and the armature being equal. In order to provide maximum energy storage capability, the spring 72 is preferably formed of titanium.

As indicated previously, the magnetic motor utilized in the sound source of the present invention operates against an inertial mass rather than the fixed casing, the inertial mass being the magnetic core 53 and 55 and the associated frame. Further, relative positioning of the armature structure 49 with respect to the magnetic cores 53 and 55 is maintained by the spring 72 essentially independently of the absolute position of the armature and the diaphragm or piston 33 to which it is connected. Thus, as the piston 33 is driven inwardly by increasing pressure, the inertial mass is merely carried inwardly as well and the gap spacing of the respective magnetic circuits is not disturbed. Further, since the two spring systems operate largely independently, the tuning of the transducer can be adjusted somewhat independently of the resonance of the loaded piston.

As will be understood by those skilled in the art, the restoring force provided by the springs 43 acting in conjunction with the mass of the diaphragm and its associated water load plus the mass of the armature are the principle factors determining the output resonant frequency of the sound source since the inertial mass is largely decoupled by the operation of the spring 72. The stiffness of the spring 72 is preferably chosen, in relation to the inertial mass, to correspond to a frequency which is substantially below the output resonant frequency. For example, with a piston diameter of 13 inches being operating at a depth of 400 feet and with the springs 43 providing a restoring force of 56000 pounds per inch of displacement, an output resonant frequency of about 100 Hz. is obtained. The inertial mass which includes the E-shaped magnetic cores is about 180 pounds and the spring 72 provides a restoring force of about 18000 pounds per inch of deflection for a equivalent resonant frequency of about 31 Hz.

Figure 5:
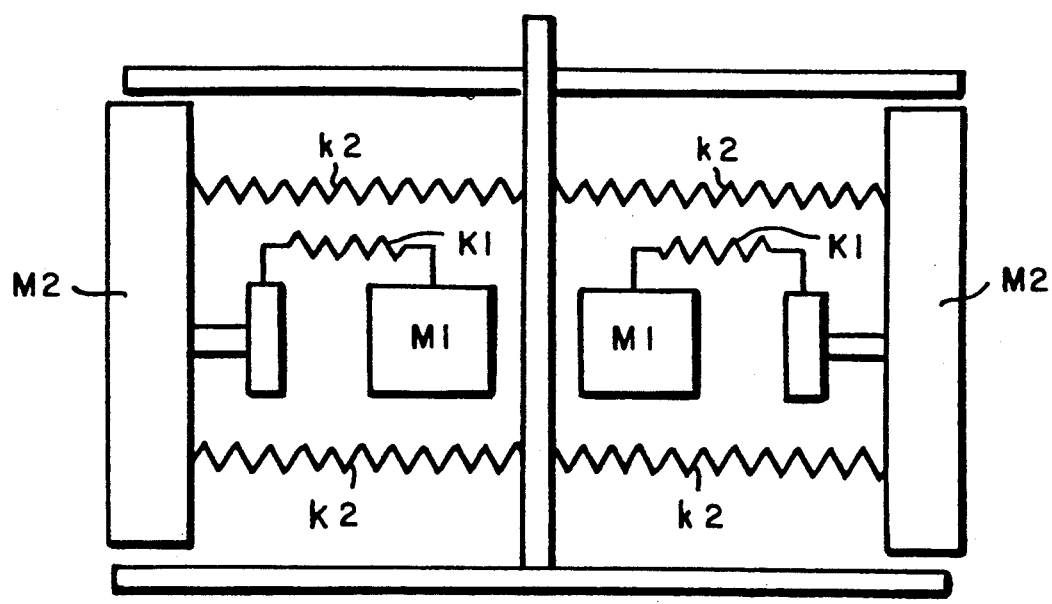
FIG. 5 is a diagram illustrating a simplified mechanical system corresponding to the sound source.
Figure 6:
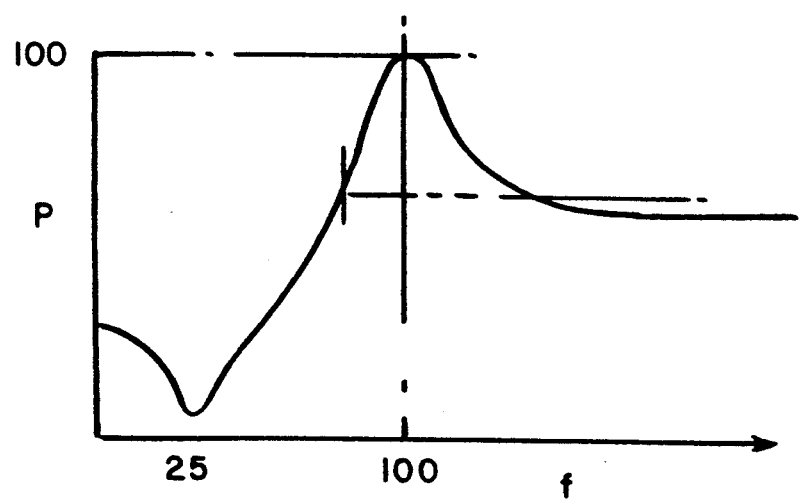
FIG. 6 is a diagram representing a corresponding response characteristic.

FIG. 5 illustrates a simplified model of the mechanical system and FIG. 6 represents a corresponding overall response characteristic. As may be seen, the sound source has a response peaked at the natural output resonant frequency but provides efficient output over an extended range, e.g., from 80 to 300 Hz.

As is also explained in the previously identified copending application, the first windings on each of the magnetic cores 53 and 55 are connected in series to a supply of direct current so as to bias the two magnetic circuits. Each of the second windings is connected to an alternating current supply. The DC biasing currents are applied so that the resultant fluxes from the two magnetic core structures on either side of the armature tend to cancel in the armature. Thus the armature sees only the sum of the average fluxes in the E-shaped cores and this sum remains essentially constant during the operating cycle. In this way a lighter armature can be utilized for a given level of energization and power output.

The second windings are installed or phased relative to the respective first windings so that, at any given instant, one of the second or AC windings aids the corresponding DC winding while the other AC winding opposes the corresponding DC winding. This phasing also causes the induced AC voltages in the DC windings to essentially cancel so that no substantial AC load is impressed on the DC supply.

As is understood by those skilled in the art, the force exerted in a variable reluctance device is proportional to the absolute value of the square of the magnetomotive force or energizing current. Accordingly, the energization of such a device with alternating current only produces a highly non-linear force which is exerted at twice the frequency of the exciting current. Typically, the ampere turns or exciting force provided by the AC current is controlled to a level below that of the DC biasing current so that no significant frequency doubling occurs though this is not completely necessary.

Figure 7:
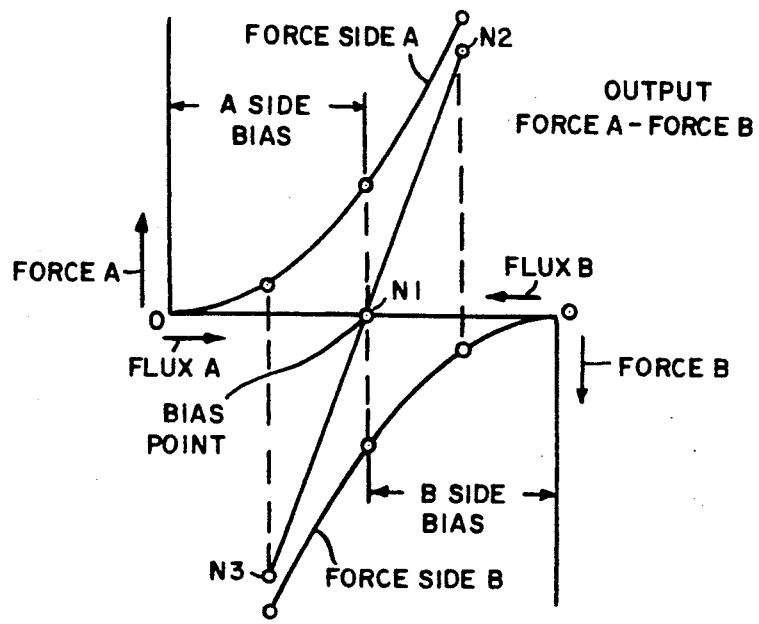
FIG. 7 is a diagram illustrating the generation of forces by a balanced magnetic transducer employed in the sound source.

FIG. 7 illustrates the forces which are generated by each of the magnetic structures. The force generated by the left hand magnetic structure being designated as force A and the force generated by the right hand magnetic structure being designated by force B. As indicated, each of the forces is a non-linear function of the flux in the respective magnetic circuit. As illustrated, when there is no AC energization, the equal and opposite bias forces cancels so that there is no net force. This is indicated at point N1. On the other hand, when the AC current aids the bias in the left hand magnetic structure and decreases the attractive force of the right hand magnetic circuit, substantial net force is provided in one direction as indicated by point N2. Conversely when the AC energization reverses an opposite force is provided as indicated by the point N3. The three points and N1-N3 lie on a straight line and the net force between these points is essentially a straight line. Accordingly, although each magnetic circuit of itself has a distinctly non-linear characteristic, the two oppositely oriented magnetic circuits, when biased in balanced fashion, can exert a relatively linear transduction characteristic. This linearity of force with current can also be illustrated mathematically as follows $$F = k(I_{DC} \pm I_{AC})^2 - k(I_{DC} \pm I_{AC})^2 = 2kI_{DC}I_{AC}$$

Figure 8:
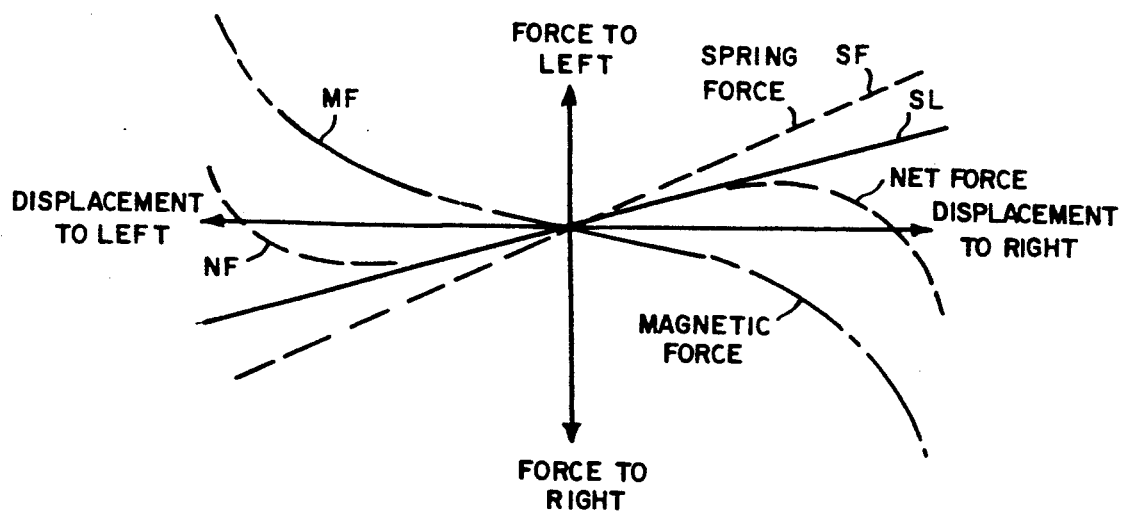
FIG. 8 is a diagram illustrating the relationship of magnetic and spring forces in the transducer.

FIG. 8 is a diagram illustrating the effect of displacement of the armature structure on the magnetic force. The magnetic force characteristic alone is the curve designated by reference character MF. As will be understood by those skilled in the art, the slope of this curve through the origin will be a function of the bias current. The spring force is an essentially linear characteristic and is illustrated by the line designated by reference character SF. The net force which is the sum of the spring and magnetic forces is illustrated by the curve designated by reference character NF. The slope of the net force curve at mid position is indicated by the line SL. Thus, for small excursions around the mid point, the slope of this line fairly represents the restoring force which is exerted between the armature and the inertial mass which comprises the coil and core structures. Since the slope of the net force curve NF depends not only on the spring constant but also on the DC bias applied to the two core structures, it can be seen that the resonant frequency of the transducer can be adjusted over some range by merely adjusting the value of the DC current provided to the DC biasing windings 41 and 43. From this diagram, it can also be inferred that distortion is minimized if the oscillatory displacement of the armature structure is limited to only a portion of the gap. As the impedance to motion of the reaction mass is high and since the hydrostatic load presented to the diaphragm is relatively stiff when the sound source is operated under water, this condition is met.

In view of the foregoing it may be seen that several objects of the present invention ar achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An underwater sound source comprising:
   a hollow shell providing axially opposed first and second ends;
   at each of said ends, a diaphragm mounted for axial movement with respect to said shell;
   means for sealing the periphery of each of said diaphragms to said shell without substantially impeding axial movement;
   spring means operating between said shell and each of said diaphragms for allowing axial movement of the diaphragm in response to external pressure;
   a separate magnetic motor for each diaphragm comprising:
   rigidly connected to each diaphragm and axially aligned therewith, a lightweight magnetic armature structure;
   an open magnetic circuit core structure on either side of said armature structure along the axis of said shell for providing a respective magnetic circuit linking each armature structure across a magnetic gap, said magnetic core structures being substantially more massive than said armature structures, each such core structure including at least one energizing winding;
   spring means operating between each armature structure and the linked core structures for resiliently maintaining a nominal gap; and
   means for connecting the windings on said magnetic core structures to an energizing supply of alternating current.

2. A sound source as set forth in claim 1 wherein said core structures for each magnetic motor comprise E-shaped laminations and wherein each armature structure comprises a single armature for completing, through a common magnetic patch, magnetic circuits for both of said core structures.

3. An underwater sound source comprising:
   a hollow shell providing axially opposed first and second ends;
   at each of said ends, a diaphragm mounted for axial movement with respect to said shell;
   means for sealing the periphery of each of said diaphragms to said shell;
   spring means operating between said shell and each of said diaphragms for allowing axial movement of the diaphragm in response to external pressure;
   a separate magnetic motor for each diaphragm comprising:
   rigidly connected to each diaphragm and axially aligned therewith, a magnetic armature structure;
   on axially opposite sides of each armature structure, magnetic core structures providing magnetic circuits which link said armature structure;
   frame means rigidly connecting the opposing core structures for each armature structure with the respective armature structure being in a gap between the opposing core structures, each of the frame means and connected core structures being mounted for axial movement within said shell;

spring means operating between each of said frame means and the corresponding armature structure for nominally centering the armature structure in said gap;

on each of said core structures, a first winding and a second winding;

means for connecting the first said windings on each pair of opposed magnetic core structures in series to a supply of direct current thereby to bias the corresponding magnetic circuits; and means for connecting the second said windings on each pair of opposed magnetic core structures to a supply of alternating current with said second windings being phased such that one of said second windings aids the corresponding first winding while the other second winding opposes the corresponding first winding thereby to oscillate the respective armature, the second windings on the two pairs of magnetic core structures being phased such that the two armatures oscillate in axial opposition.

4. A sound source as set forth in claim 3 wherein said core structures comprise E-shaped laminations and wherein each said armature structure comprises a single armature for completing, through a common magnetic patch, magnetic circuits for both of the linked core structures.

5. An underwater sound source comprising:

a hollow shell providing axially opposed first and second ends;

at each of said ends, a rigid circular diaphragm mounted for axial movement with respect to said shell;

means for sealing the periphery of each of said diaphragms to said shell;

first spring means operating between said shell and each of said diaphragms for allowing axial movement of the diaphragm in response to external pressure;

a separate magnetic motor for each diaphragm comprising:

axially aligned with each of said diaphragms, a lightweight magnetic armature;

means connecting the periphery of said diaphragm to the periphery of said armature;

on axially opposite sides of each armature structure, magnetic core structures providing open magnetic circuits which link said armature, the armature completing, through a common magnetic path, magnetic circuits for both of said opposed core structures;

frame means rigidly connecting the opposing core structures for each armature structure, with the linked armature structure being in a gap between the opposing core structures, each of the frame means and connected core structures being mounted for axial movement within said shell;

second spring means operating between each of said frame means and the linked armature structure for nominally centering the respective armature structure in said gap;

on each of said core structures, a first winding and a second winding;

means for connecting the first said windings on each pair of opposed magnetic core structures in series to a supply of direct current thereby to bias the respective magnetic circuits with the bias fluxes from said core structures being opposed in said armature; and means for connecting the second said windings on each pair of opposed magnetic core structures to a supply of alternating current with said second windings being phased such that one of said second windings aids the corresponding first winding while the other second winding opposes the corresponding first winding thereby to oscillate the armature, the second windings on the two pairs of magnetic core structures being phased such that the two armatures oscillate in axial opposition.

6. An underwater sound source comprising:

a hollow shell providing axially opposed first and second ends;

at each of said ends, a diaphragm mounted for axial movement with respect to said shell;

for sealing the periphery of each of said diaphragms to said shell, a pair of back-to-back rolling diaphragms, the space between said rolling diaphragms being filled with an incompressible liquid;

spring means operating between said shell and each of said diaphragms for allowing axial movement of the diaphragm in response to external pressure;

rigidly connected to each of said diaphragms and axially aligned therewith, a magnetic armature structure;

a magnetic core structure for each armature for providing a respective magnetic circuit linking each armature structure across a magnetic gap, said magnetic core structures being substantially more massive than said armature structures, each magnetic core structure including at least one energizing winding;

spring means operating between each of said magnetic core structures and the magnetically linked armature structure for resiliently maintaining a nominal gap; and means for connecting windings on said magnetic core structures to an energizing supply of alternating current.

7. An underwater sound source comprising:

a hollow shell providing axially opposed first and second ends;

at each of said ends, a diaphragm mounted for axial movement with respect to said shell;

for sealing the periphery of each of said diaphragms to said shell, a pair of back-to-back rolling diaphragms, the space between said rolling diaphragms being filled with an incompressible liquid;

spring means operating between said shell and each of said diaphragms for allowing axial movement of the diaphragm in response to external pressure;

rigidly connected to each of said diaphragms and axially aligned therewith, an armature structure;

on axially opposite sides of each armature structure, magnetic core structures providing magnetic circuits which link said armature structure;

frame means rigidly connecting the opposing core structures for each armature structure with the linked armature structure being in a gap between the opposing core structures, each of the frame means and connected core structures being mounted for axial movement within said shell;

spring means operating between each of said frame means and the corresponding armature structure for nominally centering the armature structure in said gap;

on each of said core structures, a first winding and a second winding;

means for connecting the first said windings on each pair of opposed magnetic core structures in series to a supply of direct current thereby to bias the corresponding magnetic circuits; and means for connecting the second said windings on each pair of opposed magnetic core structures to a supply of alternating current with said second windings being phased such that one of said second windings aids the corresponding first winding while the other second winding opposes the corresponding first winding thereby to oscillate the respective armature, the second windings on the two pairs of magnetic core structures being phased such that the two armatures oscillate in axial opposition.

* * * * *